United States Patent [19]
Beaverson et al.

[11] Patent Number: 5,280,608
[45] Date of Patent: Jan. 18, 1994

[54] PROGRAMMABLE STALL CYCLES

[75] Inventors: Aurthur J. Beaverson, Maynard, Mass.; Thomas E. Hunt, Brookline, N.H.; Gary P. Lidington, Wayland, Mass.

[73] Assignee: Digital Equipment Corporation, Maynard, Mass.

[21] Appl. No.: 724,379

[22] Filed: Jun. 28, 1991

[51] Int. Cl.⁵ ............................................. G01R 31/318
[52] U.S. Cl. ......................................... 395/575; 371/28
[58] Field of Search .......................... 371/16.1, 18, 28; 395/575, 425, 275, 325, 550; 340/825.5; 370/85.2; 364/240.5, 271.6

[56] References Cited

U.S. PATENT DOCUMENTS

| | | | |
|---|---|---|---|
| 4,462,072 | 6/1984 | Tague et al. | 395/575 |
| 4,564,943 | 1/1986 | Collins et al. | 371/28 |
| 4,611,320 | 9/1986 | Southard | 370/13 |
| 4,669,079 | 5/1987 | Blum | 370/85.6 |
| 4,965,717 | 10/1990 | Cutts, Jr. et al. | 395/425 |
| 5,005,172 | 4/1991 | Kawamoto | 371/16.1 |
| 5,067,071 | 11/1991 | Schanin et al. | 395/275 |
| 5,239,651 | 8/1993 | Sodos | 395/725 |
| 5,241,632 | 8/1993 | O'Connell et al. | 395/325 |

Primary Examiner—Charles E. Atkinson
Assistant Examiner—Albert Decady
Attorney, Agent, or Firm—Kenyon & Kenyon

[57] ABSTRACT

A system and method for testing a computing system by introducing stall cycles at an arbiter that controls access to a bus that is commonly used by the CPU and I/O devices for stressing the computing system with regard to the latency and bandwidth.

13 Claims, 5 Drawing Sheets

PROGRAMMABLE STALL CYCLES

FIELD OF THE INVENTION

The present invention relates to a system and method for introducing stall cycles to an arbitration scheme for stressing the bandwidth and latency characteristics of a computing system.

BACKGROUND OF THE INVENTION

The central processing unit ("CPU") of a computing system or input/output ("I/O") devices connected to the computing system may request and be granted access to, and control of, a commonly used bus, such as a system bus. An arbiter in turn is used to arbitrate bus requests and grant certain of those requests based on the programmed arbitration parameters.

Typically, the CPU and I/O devices require access and control of the bus for a predetermined period of time after it has requested such control. If access is not granted within the maximum latency tolerance of the device, performance degradation and a potential loss of data may occur in the computing system.

Similarly, the CPU and I/O devices also require that they be allowed to control the bus for a specific period of time over a given time interval. If they are not allowed this period of time, it may result in bandwidth problems which also may affect computing system operations.

Computing system failures may occur because of these latency and bandwidth problems. Typically, the failures occur under peak loading conditions and are a function of the number of I/O devices competing for the bus along with the CPU, the data rates of these I/O devices, the loads on the devices, and the request rates for control of the bus by the CPU and I/O devices.

It's customary in the development of computing systems to stress latency and bandwidth in the debugging process. This stress testing is used to determine the limits of the system and ensure that the system performs optimally in the expected application environment.

Prior methods of performing such testing used software to attempt to create or recreate certain occurrences that caused system failures. Such testing was difficult to do because of the inability to control the interaction among various I/O devices in a deterministic manner. Therefore, large amounts of software run for a long period of time was required to create various latencies and bandwidth conditions the system would encounter in normal operations. This process of using large amounts of software to test latency and bandwidth was non-deterministic and in no way ensured that all of the desired stressing conditions were delivered to the system.

SUMMARY OF THE INVENTION

The present invention is a system and method that may be used for testing a computing system by stressing it by introducing "stall cycles." These stall cycles are periods of time during which the bus is unavailable to any of the system devices that request the bus, such as the CPU and I/O devices. The frequency and duration of the stall cycles are variable and are used to stress the computing system latency an bandwidth characteristics associated with access and control of a bus in a more deterministic manner.

The system of the present invention may be incorporated into a computing system that includes a central processing unit ("CPU"), a commonly used bus, such as a system bus, a system element that is connected to the commonly used bus, such as memory, I/O devices, and an arbiter that controls access to the commonly used bus.

The system of the present invention is embodied as a logic circuit and arbiter that introduce controllable stall cycle signals to the computing system through such arbiter. The system of the present invention is enhanced by a feedback grant line associated with the stall cycle signals.

The system and method of the present invention also may include the use of two programmable registers that function as counters to control the duty cycle of the stall cycle signal input to the arbiter. This gives the system greater flexibility to present a number of different operating situations for stressing the computing system.

Besides the internally configured logic circuit used with the arbiter for the system for carrying out the method of the present invention, the stall cycle signals also may be introduced by an external pulse generator that is plugged into the arbiter. This pulse generator may be a stand-alone device or may be part of a larger diagnostic tool. In the latter case, there may be a feedback signal from the arbiter to the diagnostic tool.

DETAILED DESCRIPTION

The present invention is a system and method for introducing controllable stall cycle signals into a computing system to stress the latency and bandwidth characteristics associated with the access and control of a bus commonly used by the system CPU and I/O devices.

Figure 1:
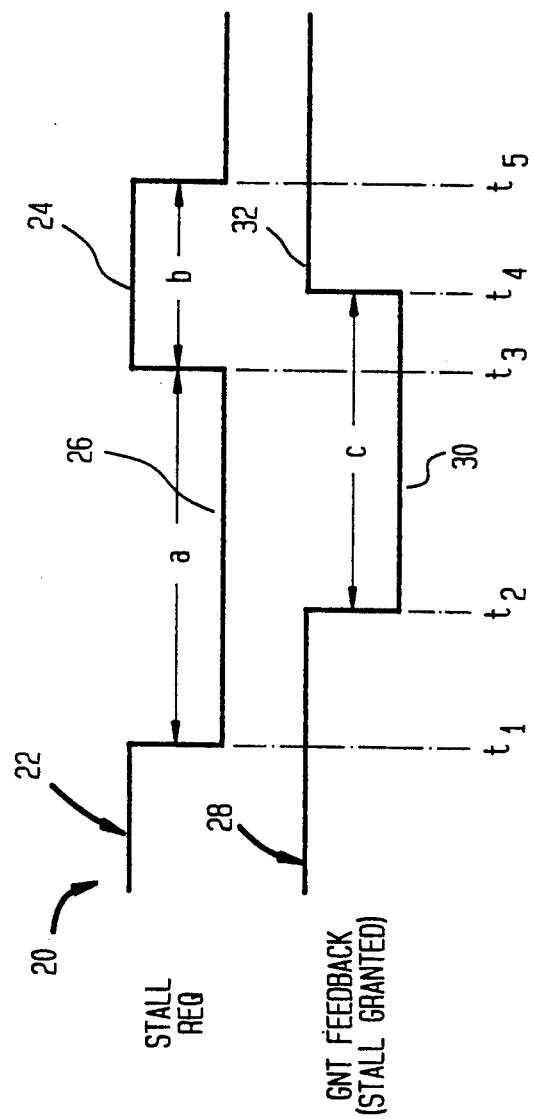
FIG. 1 shows a timing diagram of request and grant signals for the system according to the present invention, with feedback.

Referring to FIG. 1, the characteristics of a stall cycle signal is shown at 20. By way of defining a stall cycle signal, "the period of the signal" is the time it takes for a signal to complete one full cycle. "The frequency of a signal" is the inverse of the period. "The duty cycle of a signal" is the percentage of time for which the signal is in the asserted state compared with the period of the signal. In FIG. 1, the stall cycle period is $(a+b)$ or $t_1$ to $t_5$, its frequency is $1/(a+b)$, and its duty cycle is $[a/(a+b)] \times 100\%$.

Figure 2:
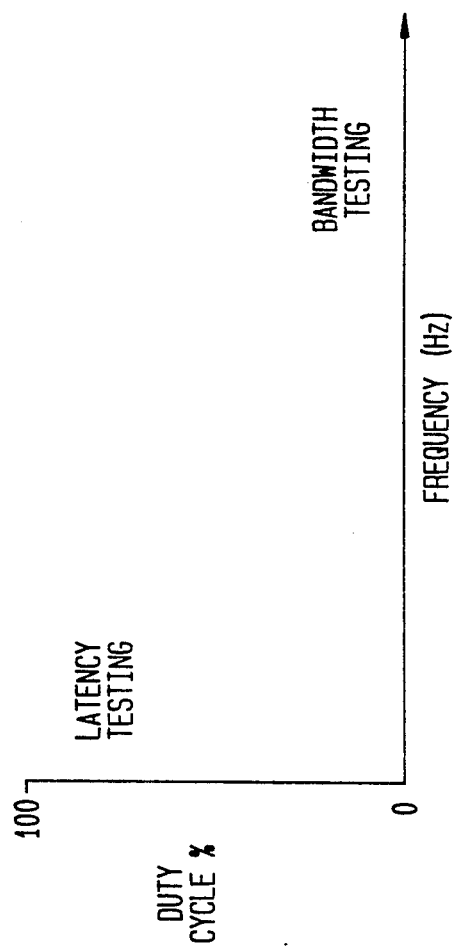
FIG. 2 shows a diagram of the stress conditions capable of being imposed on a computing system by the system of the present invention.

FIG. 2 shows the stresses that the system of the present invention may impose on a computing system by way of stall cycles. More specifically, the diagram shows the conditions under which bandwidth and latency characteristics may be tested. According to FIG. 2, when a stall cycle signal has a high frequency and low duty cycle, the bandwidth characteristics of the computing system are tested. Under these conditions, it is difficult for the system devices requesting the bus to meet their bandwidth requirements because of frequent conflicts with the stall cycles. When a stall cycle signal has low frequency and a high duty cycle, the latency characteristics of the computing system are tested. Under these conditions, it is difficult for devices requesting the bus to meet their latency requirements because they will be prevented from accessing the bus for long periods of time.

It would be understood by a person of ordinary skill in the art that one can select stress conditions at other locations in the diagram to achieve the desired balance between latency and bandwidth testing.

The present invention is preferably incorporated in a computing system that includes at least a CPU, a commonly used bus, a system element connected to the commonly used bus, I/O devices, and an arbiter that arbitrates requests from the I/O devices and CPU in order to grant them access to the commonly used bus one at a time.

Figure 3:
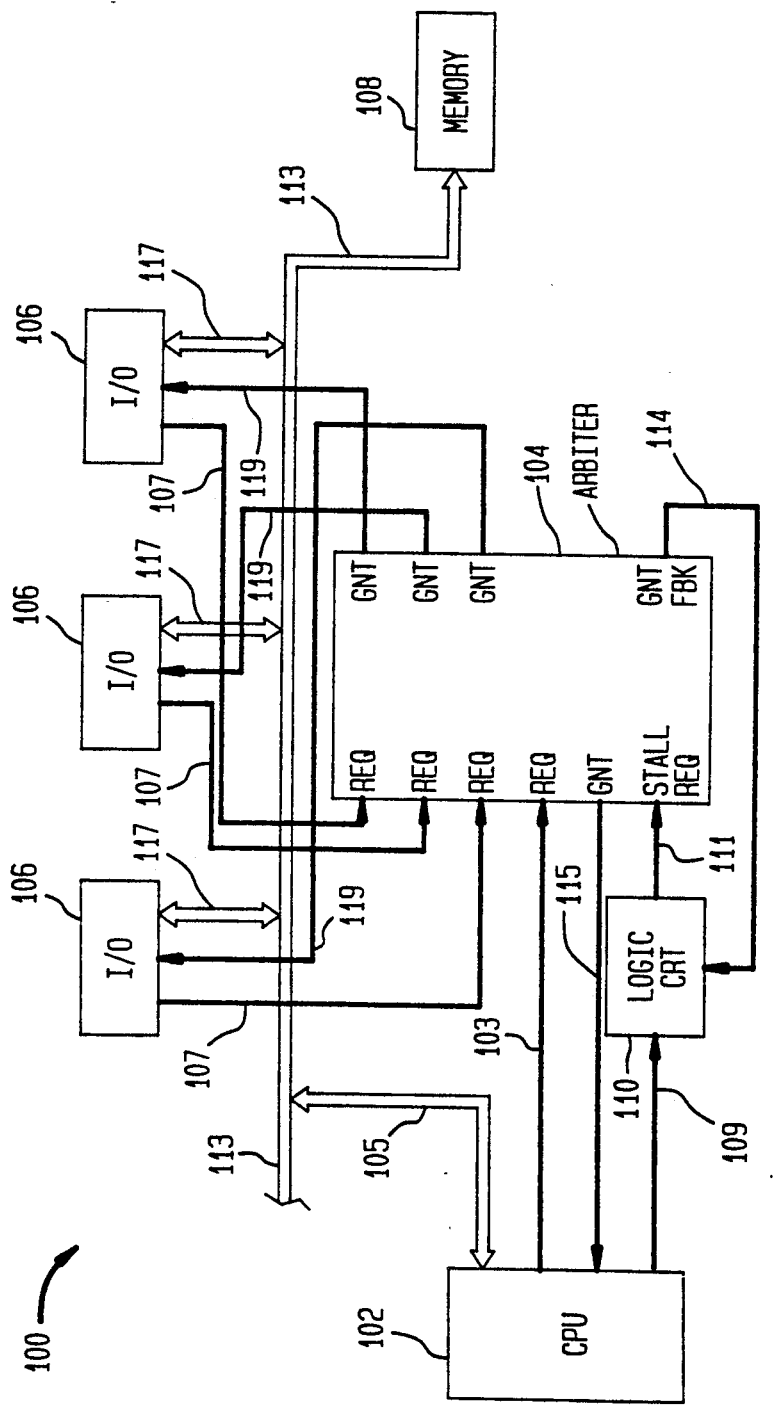
FIG. 3 shows a block diagram for use in discussing the preferred embodiment of the system according to the present invention.

In FIG. 3, the computing system incorporating the system of the present invention is shown generally at 100. The computing system comprises CPU 102 that connects to arbiter 104 via REQUEST line 103 and GRANT line 115, logic circuit 110 via line 109, and system bus 113 via connection bus 105. The REQUEST line 103 carries system bus request signals from the CPU to the arbiter and GRANT line 115 system bus grant signals from the arbiter to the CPU. Line 109 handles control signals that are sent from the CPU to the logic circuit for control of the generation of stall cycle signals.

Logic circuit 110 is operable with the arbiter to form the system of the present invention that is used for generating and introducing a stall cycle signal into the computing system for controllably stressing the computing system. As shown, logic circuit 110 connects to arbiter 104 via line 111 and feedback line 114.

The plurality of I/O devices 106 connect to arbiter 104 via REQUEST lines 107 and GRANT lines 119. Each I/O device is connected to system bus 113 and memory 108 by connection bus 117.

In operation, the CPU sends initiation signals over to logic circuit 110 which generates a predetermined stall cycle signal that is input to arbiter 104 on line 111 and the computing system then resumes its normal operation. Requests for the system bus may then be sent from CPU 102 and I/O device 106. Depending on the duty cycle of the stall cycle signal, the requests from the CPU and the I/O devices may be granted or delayed for a period of time. This will cause both latency and bandwidth stressing of the computing system according to the diagram in FIG. 2.

In the preferred embodiment of the system of the present invention shown in FIG. 3, the system includes feedback line 114. FIG. 1, shows the timing diagram 20 for the request and grant signals for the system of the present invention with feedback over feedback line 114 as shown in FIG. 3. Assuming that the arbiter is an active low device, the STALL REQ signal 22 has a period with asserted portion "a" at 26 and de-asserted portion "b" at 24. The GNT (grant) signal shown at 28 is asserted and de-asserted based on the STALL REQ signal at 22 and the availability of the system bus.

When the system of the present invention includes feedback, it is possible to accurately determine the length of the stall cycle which equals the latency system devices will experience. For example, the additional latency created by the STALL REQ signal is $t_2$ to $t_4$. This is shown as the asserted period of the GNT signal at "c" shown at 30.

The first embodiment may also be configured to not include feedback line 114. When it is configured this way, the grant signal is not tracked. That is, the stall cycle signals are generated and sent to the arbiter but grant signal information is not tracked via a feedback line.

Figure 4:
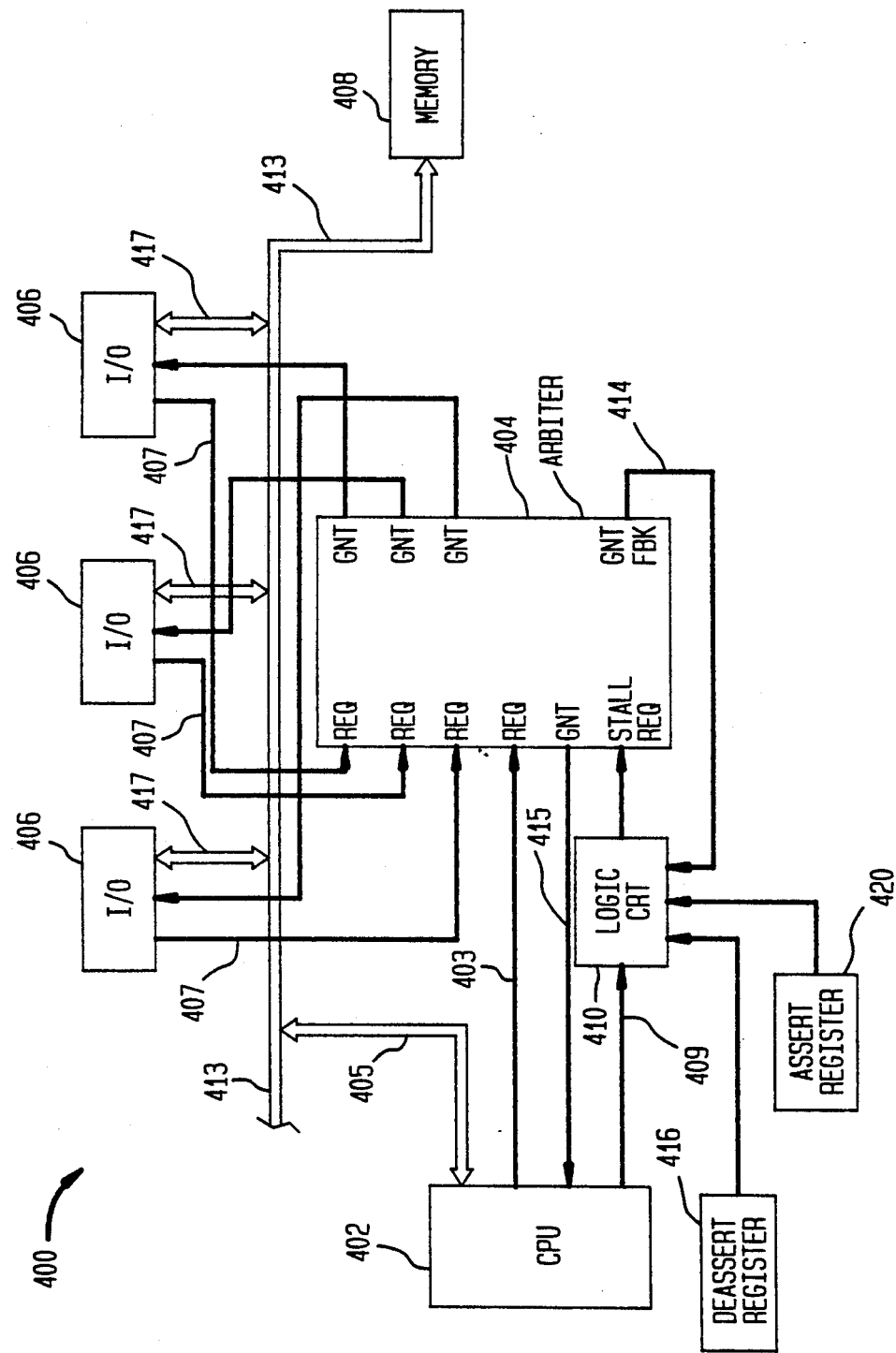
FIG. 4 shows a block diagram for use in discussing the second embodiment of the system according to the present invention.

The computing system incorporating a second embodiment of the system of the present invention is shown in FIG. 4. It has CPU 402 connected to arbiter 404 via REQUEST line 403 and GRANT line 415, logic circuit 410 via line 409, and system bus 413 via connection bus 405. REQUEST line 403 carries system bus request signals from the CPU to the arbiter and GRANT line 415 system bus grant signals from the arbiter to the CPU. Line 409 handles control signals that are sent from the CPU to the logic circuit for control of the generation of stall cycle signals.

Logic circuit 410, connected to arbiter 404 via line 411 and feedback line 414, has two programmable registers, de-assertion register 416 and assertion register 420. These programmable registers form counters for controlling the de-assertion and assertion sections of the duty cycle of the STALL REQ. By using these two registers, it gives added flexibility to the system permitting the stressing conditions to be changed automatically under software control and eliminates the need for external test hardware.

The plurality of I/O devices 406 connect to arbiter 404 via REQUEST lines 407 and GRANT lines 419, and to system bus 413 by connection bus 417. The system bus connects to memory 408.

In operation, the first activity is to program the de-assertion and assertion periods for the duty cycle of the STALL REQ signal. This is accomplished through the CPU. After this, the CPU sends the initiation signal to logic circuit 410 which causes the generation of the STALL REQ signal based on the programmed duty cycle. This stall cycle signal is input to arbiter 404 on line 411 and competes with the other requests for the bus. The duty cycle and frequency of the stall cycle signal determines how the computing system is stressed (see FIG. 2).

Once the logic circuit is activated and STALL REQ signal is input to the arbiter, the computing system is operated as normal. In this operation, requests for the system bus may be sent from the CPU and I/O devices 106. Depending on the duty cycle of the stall cycle signal, the requests from the CPU and I/O devices may be granted or delayed for a period of time. This will cause both latency and bandwidth stressing of the computing system according to the diagram in FIG. 2.

The ability to vary the duty cycle of the STALL REQ signal permits greater flexibility in stressing the system. Accordingly, some problems that are hidden at certain duty cycles will be revealed at others.

The second embodiment shown in FIG. 4 includes feedback line 414. However, the second embodiment, like the first embodiment, may be configured without a feedback line.

Figure 5:
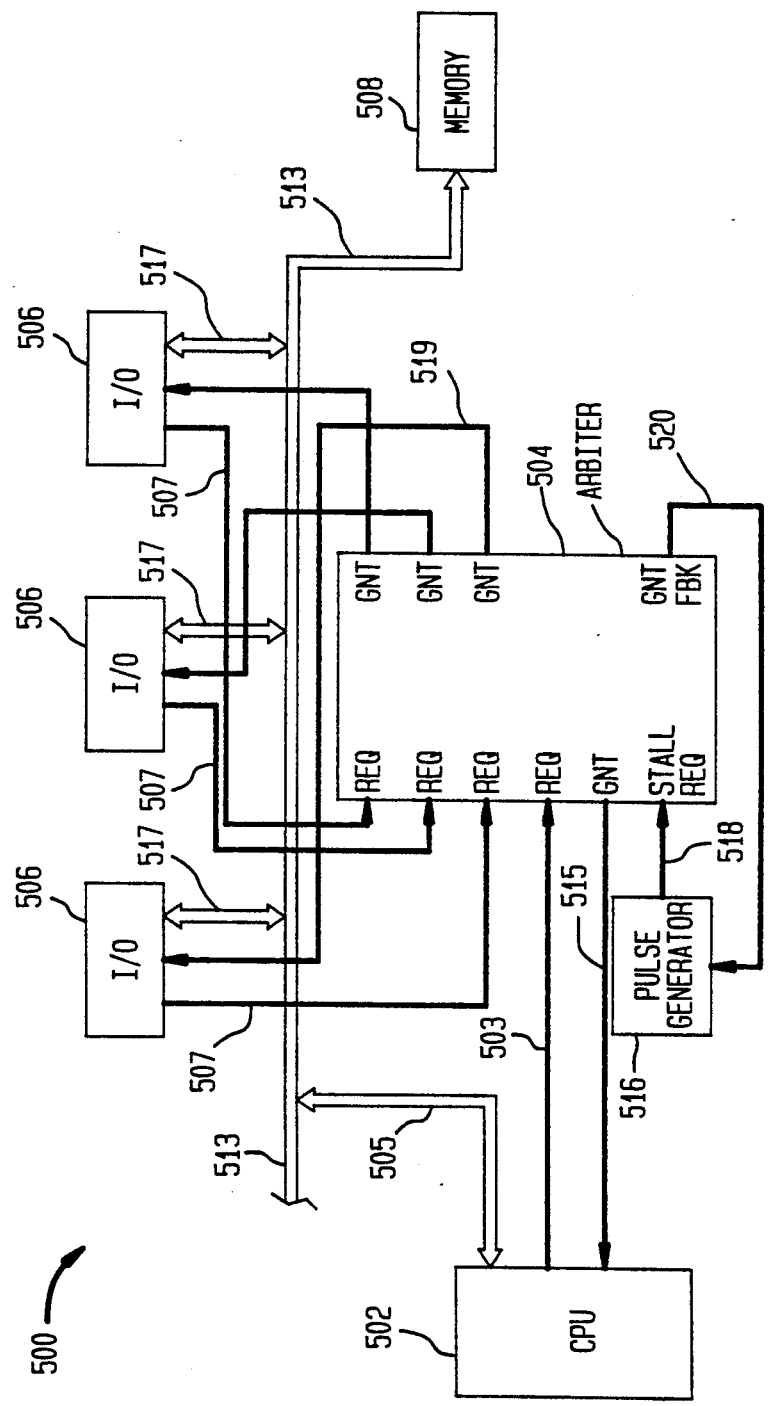
FIG. 5 shows a block diagram for use in discussing the third embodiment of the system according to the present invention.

The third embodiment of the system of the present invention will be described referring to FIG. 5. The third embodiment of the present invention is incorporated in the computing system shown generally at 500.

In the computing system shown there, CPU 502 connects to arbiter 504 via REQUEST line 503 and GRANT line 515. REQUEST line 503 carries system bus request signals from the CPU to the arbiter and GRANT line 515 system bus grant signals from the arbiter to the CPU. The CPU connects to system bus 513 via bus connector 505.

Pulse generator 516 connects to the STALL REQ input of arbiter 504 via line 518, and generates the stall cycle signal that is used for stressing the computing system. Although FIG. 5 shows feedback line 520 connected from arbiter 504 to pulse generator 516, this is meant for a situation when the pulse generator is part of a larger diagnostic tool and feedback line 520 connects to that tool. When pulse generator 516 is used alone, feedback line 520 is not used.

Preferably, the pulse generator is connected externally to the arbiter and may have an adjustable duty cycle which will provide the advantage discussed above with regard to the second embodiment of the system of the present invention.

The plurality of I/O devices 506 connect to arbiter 504 via REQUEST lines 507 and GRANT lines 519. Each I/O device is connected to system bus 513 by connection bus 517 with bus 513 in turn connected to memory 508.

In operation, the pulse generator is plugged into the arbiter and the STALL REQ signals are input to the arbiter. The STALL REQ signal imposes stress on the computing system in an attempt to identify latency and bandwidth problems.

During computing system operation, the CPU and I/O devices 106 provide system bus requests to the arbiter. Depending on the duty cycle of the stall cycle signal, the arbiter will grant or delay for a period of time the system bus requests from the CPU and I/O devices. This will cause both latency and bandwidth stressing of the computing system in accordance with the diagram in FIG. 1.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A system for controllably imposing stress conditions on a computing system, comprising:
    an arbiter for controlling access to a bus commonly used by a plurality of devices, with the arbiter having means for receiving requests for the bus from each of the plurality of devices and means for issuing grants to each of the plurality of devices;
    a logic circuit coupled to the arbiter for inputting to the arbiter a stall cycle signal having a predetermined frequency and duty cycle, and for introducing the stall cycle signal into arbitration being performed by the arbiter with regard to requests received by the arbiter for access and control of the bus from the plurality of devices.

2. The system as recited in claim 1, wherein the system further includes a feedback loop that interconnects the arbiter and the logic circuit for providing grant signal status to the logic circuit.

3. The system as recited in claim 1, wherein the stall cycle signal output from the logic circuit is controlled by a central processing unit of the computing system.

4. The system as recited in claim 1, wherein the logic circuit includes a first programmable register and a second programmable register for controlling a duty cycle of the stall cycle signal being input to the arbiter.

5. The system as recited in claim 4, wherein the first and second programmable registers function as counters.

6. A system for controllably imposing stress conditions on a computing system, comprising:
    an arbiter for controlling access to a bus commonly used by a plurality of devices, the arbiter having means for receiving requests for the bus from each of the plurality devices and means for issuing grants to each of the plurality devices;
    a pulse generator that is detachably connected to an input of the arbiter for inputting thereto a stall cycle signal having a predetermined frequency and duty cycle and introducing the stall cycle signal into arbitration being performed by the arbiter with regard to requests received by the arbiter for access and control of the bus for the plurality of devices, and with the stall cycle signal being for bandwidth and latency stress testing of the computing system.

7. The system as recited in claim 6, wherein the pulse generator is a stand-alone device.

8. The system as recited in claim 6, wherein the duty cycle of the stall cycle signal output from the pulse generator is adjustable.

9. The system as recited in claim 6, wherein the system further includes a feedback loop that connects between the arbiter and a device associated with the pulse generator.

10. The system as recited in claim 9, wherein the stall cycle signal output from the pulse generator is controlled by the device associated with the pulse generator.

11. A method for controllably imposing stress conditions on a computing system, comprising the steps of:
    connecting a plurality of devices to an arbiter that controls the access of the plurality of devices have to a commonly used bus, with each of the plurality devices being capable of requesting access to the bus and receiving grants of access to the bus from the arbiter; and
    generating a stall cycle signal having a predetermined frequency and duty cycle and inputting the stall cycle signal into the arbiter for bandwidth and latency stress testing of the computing system.

12. The method as recited in claim 11, wherein the method further comprising the step of varying the duty cycle of the stall cycle signal.

13. The method as recited in claim 11, wherein the method further includes the step of feeding back a signal for the arbiter for tracking the status of grant signals.

* * * * *